United States Patent
Campbell et al.

(10) Patent No.: US 11,018,331 B2
(45) Date of Patent: May 25, 2021

(54) PHOSPHATE STABILIZED LITHIUM ION BATTERY CATHODE

(71) Applicant: NANO ONE MATERIALS CORP., Burnaby (CA)

(72) Inventors: Stephen A. Campbell, Burnaby (CA); O'Rian Reid, Burnaby (CA)

(73) Assignee: Nano One Materials Corp., Burnaby (CA)

(*) Notice: Subject to any disclaimer, the term of this patent is extended or adjusted under 35 U.S.C. 154(b) by 38 days.

(21) Appl. No.: 16/348,543

(22) PCT Filed: Nov. 14, 2017

(86) PCT No.: PCT/CA2017/051352
§ 371 (c)(1),
(2) Date: May 9, 2019

(87) PCT Pub. No.: WO2018/090132
PCT Pub. Date: May 24, 2018

(65) Prior Publication Data
US 2019/0363342 A1    Nov. 28, 2019

Related U.S. Application Data

(60) Provisional application No. 62/422,403, filed on Nov. 15, 2016.

(51) Int. Cl.
*H01M 4/131* (2010.01)
*C01G 45/12* (2006.01)
(Continued)

(52) U.S. Cl.
CPC ........ *H01M 4/131* (2013.01); *C01G 45/1228* (2013.01); *H01M 4/525* (2013.01); *H01M 10/0525* (2013.01); *H01M 2004/027* (2013.01)

(58) Field of Classification Search
CPC . C01G 45/1228; C01G 53/42; C01P 2002/32; H01M 10/0525;
(Continued)

(56) References Cited

U.S. PATENT DOCUMENTS 6,322,744 B1 * 11/2001 Kelley .................. H01M 4/366
  264/446
2012/0028113 A1 * 2/2012 Huang .................... H01M 4/36
  429/209

(Continued)

FOREIGN PATENT DOCUMENTS

JP    2012 033482    2/2012

OTHER PUBLICATIONS

Chang-Heum et al. "An effective method to reduce residual lithium compounds on Ni-rich Li[Ni0.6Co0.2Mn0.2]O2 active material using a phosphoric acid derived Li3PO4 nanolayer", Nano Research, vol. 8, issue 5, May 2015, pp. 1464-1479 (Year: 2015).*
(Continued)

*Primary Examiner* — Victoria H Lynch
(74) *Attorney, Agent, or Firm* — Joseph T. Guy; Patent Filing Specialist Inc.

(57) ABSTRACT

A stabilized lithium ion cathode material comprising a calcined manganese oxide powder wherein the manganese on a surface is $MnPO_4$, comprises an manganese phosphate bond, or the phosphate is bonded to the surface of the cathode material.

17 Claims, 7 Drawing Sheets

(51) Int. Cl.
*H01M 4/525* (2010.01)
*H01M 10/0525* (2010.01)
*H01M 4/02* (2006.01)

(58) Field of Classification Search
CPC ........... H01M 2004/027; H01M 4/131; H01M 4/1391; H01M 4/366; H01M 4/505; H01M 4/525; H01M 4/5825; Y02E 60/10
See application file for complete search history.

(56) References Cited

U.S. PATENT DOCUMENTS

| 2014/0272579 | A1* | 9/2014 | Frianeza-Kullberg | ........................ C01G 45/12 429/218.1 |
| 2017/0331107 | A1* | 11/2017 | Okamoto | .............. H01M 4/366 |
| 2020/0266420 | A1* | 8/2020 | Ko | ........................ H01M 4/134 |

OTHER PUBLICATIONS

N. Marandian Hagh et al.; Electrochemical Performance of Acid-Treated Nanostructured LiMn1.5Ni0.5O4 [delta].

* cited by examiner

PHOSPHATE STABILIZED LITHIUM ION BATTERY CATHODE

CROSS-REFERENCE TO RELATED APPLICATIONS

The present application claims priority to U.S. Provisional Application No. 62/422,403 filed Nov. 15, 2016 which is incorporated herein by reference.

BACKGROUND

The present invention is related to an improved method of forming fine and ultrafine powders and nanopowders of lithium ion cathodes for batteries with phosphate stabilization and a method of preparation. More specifically, the present invention is related to lithium ion battery cathodes, and particularly lithium ion battery cathodes with a spinel crystalline structure, wherein the surface ions are stabilized by the presence of surface phosphates against changes in oxidation state.

There is an ever present demand for improvements in batteries. There are two primary applications for batteries with one being stationary applications and the other being mobile applications. With both stationary and mobile applications there is a desire for increased storage capacity, longer battery life, the ability to reach full charge quicker and a lower manufacturer cost. Lithium ion batteries, comprising a lithium metal oxide cathode, are highly advantageous as a suitable battery for most applications and they have found favor across the spectrum. Still, there is a desire for an improvement in, particularly, the storage capability, recharge time, cost and storage stability of lithium ion batteries. The present invention is focused, primarily, on lithium ion batteries and improvements therein.

Lithium ion batteries comprising oxides of at least manganese, and preferably also nickel and cobalt are widely used. Often referred to as NMC; an acronym for batteries or cathodes comprising nickel, manganese and cobalt; these batteries can be in several forms including a spinel form which is of utmost importance herein. One problem with NMC batteries is the reactivity of the manganese, particularly manganese at the surface. Upon sintering, oxide can be liberated and, particularly with spinels, the manganese is reduced. Therefore, the $Mn^{4+}/Mn^{3+}$ redox process is thwarted by the formation of $Mn^{2+}$. It has now been discovered that the $Mn^{2+}$ is also a source of contamination to the subsequent graphite anode resulting in a degradation in cycling performance. The present invention mitigates this problem.

SUMMARY OF THE INVENTION

It is an object of this invention to provide an improved cathode for lithium ion batteries.

It is a particular object of the invention to provide a stabilized manganese oxide based lithium ion battery, preferably also comprising at least one of nickel and cobalt, wherein the manganese is stabilized against reduction to $Mn^{+2}$.

A particular feature of the invention is improved battery properties utilizing manganese oxide based lithium ion cathodes, particularly in a spinel crystalline structure, with improved properties.

These and other advantages, as will be realized, are provided in a lithium ion cathode material comprising a calcined oxide powder comprising manganese and phosphate bound to a surface of the calcined oxide powder.

Yet another embodiment is provided in a battery comprising a lithium ion cathode material. The lithium ion cathode material comprises a calcined oxide powder comprising manganese and phosphate bound to a surface of the calcined oxide powder. The battery also comprises an anode.

Yet another embodiment is provided in a method of forming a lithium ion cathode material comprising: calcining an oxide precursor to form calcined oxide powder wherein the calcined oxide powder comprises manganese; and reacting a surface of the calcined oxide powder with a phosphate thereby forming a phosphate bonded to a surface of the calcined oxide powder.

DESCRIPTION

Figure 1:
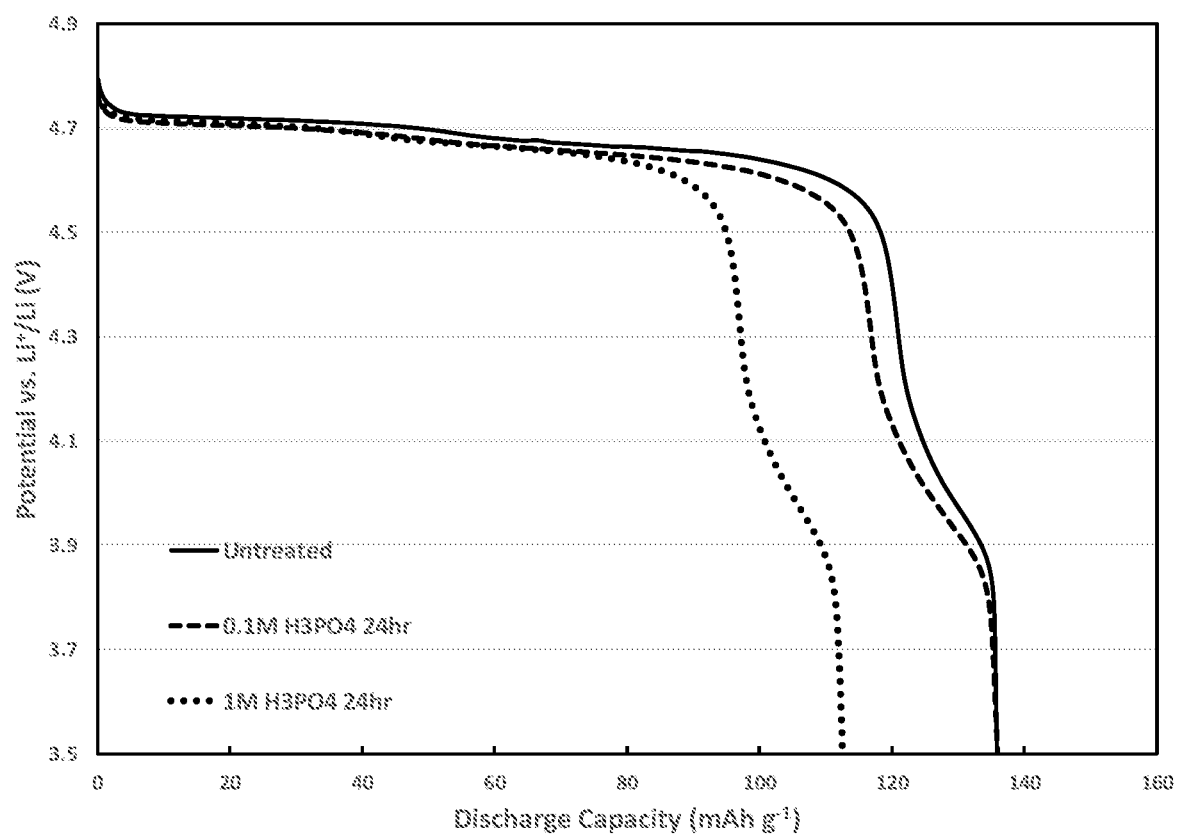
FIGS. 1-7 are graphical representations of embodiments of the invention.

The instant invention is specific to an improved lithium ion battery, and particularly the cathode of a lithium ion battery, wherein the manganese is stabilized thereby mitigating the formation of $Mn^{2+}$ which is now realized to contaminate the subsequently formed graphite anode. More specifically, the present invention is related to a method of forming an improved lithium ion battery and an improved battery formed thereby.

The lithium metal compound of the instant invention comprises an oxide of manganese and optionally, but preferably, at least one of nickel or cobalt capable of reversible lithium insertion therein. A particularly preferred lithium metal compound in a layered rock-salt crystalline structure, referred to herein as rNMC, is defined by Formula I:

$$Li_{1-a-b-c-d}Ni_aMn_bCo_cD_dO_2 \quad \text{Formula I}$$

wherein D is a dopant;
a+b+c+d≤1; at least b is not zero; and more preferably none of a, b or c are zero; and d is ≤0.1.

By convention the metal ratios are reported as a ratio such as, for example an equal distribution of Ni, Mn and Co would be referred to as 111 indicating about 0.33 mole fraction of each. Similarly, a cathode with 0.5 mole fraction Ni and 0.25 mole fraction of each of Mn and Co would be referred to as 211. In particularly preferred embodiments the rNMC includes 1:1:1.

Another particularly preferred lithium metal compound is in a spinel crystal structure, referred to herein as sNMC, defined by Formula II:

$$LiNi_xMn_yCo_zE_eO_4 \quad \text{Formula II}$$

wherein E is a dopant;
x+y+z+e≤2; at least y is not zero; and more preferably x and y are not zero; and e is ≤0.1.

In particularly preferred embodiments the sNMC is $LiNi_{0.5}Mn_{1.5}O_4$

In Formulas I and II the lithium is defined stoichiometrically to balance charge with the understanding that the lithium is mobile between the anode and cathode and therefore at any given time the cathode may be relatively lithium rich or relatively lithium depleted. Likewise, the metals are represented in charge balance with the understanding that the metal may be slightly rich or slightly depleted, as determined by elemental analysis, due to the inability to formulate a perfectly balanced stoichiometry in practice.

Dopants can be added to enhance the properties of the oxide such as electronic conductivity and stability. The dopant is preferably a substitutional dopant added in concert with the primary nickel, manganese and cobalt. The dopant preferably represents no more than 10 mole % of the oxide. Preferred dopants include Al, Gd, Ti, Zr, Mg, Ca, Sr, Ba, Mg, Cr and B with Al and Gd being particularly preferred.

The cathode is formed from an oxide precursor comprising salts of Li, Ni, Mn and Co, as will be more fully described herein, and the oxide precursor is sintered to form the cathode material as a metal oxide. The cathode material is then treated with a phosphoric acid. The phosphoric acid is applied to the surface of the metal oxide wherein the phosphate moiety forms a $MnPO_4$ on the surface of the metal oxide, or bonded to the surface of the metal oxide, wherein manganese is predominantly in the +3 oxidation state with preferably less than 10% of the surface manganese being in the +2 oxidation state and the manganese is thereby stabilized against reduction to $Mn^{2+}$ at the surface. The reaction liberates acid which is removed by washing. It is preferred that the native manganese oxide of the sintered oxide precursor be reacted with phosphate as opposed to an added manganese, other metal, or manganese which is not in the oxide lattice. Therefore, it is preferred that the added phosphate be relatively free of Mn and more preferably less than 1 wt % manganese. It is preferable that no manganese be added with the phosphate or after formation of the oxide. It is preferable that there by no separate manganese phosphate phase such as crystalline manganese phosphate as a distinct phase on the surface. It is preferable that the phosphate ligate the surface of the metal oxide without the formation of crystalline manganese phosphate.

sNMC crystallizes in the Fd-3m space group with a lattice dimensions of a=8.174 Å. While not limited to theory, it is hypothesized herein that formation of a phosphate bond to a lattice oxide provides the stabilization necessary whereas when phosphate is incorporated with additional manganese crystals of manganese phosphate are formed on the surface. Whereas the manganese phosphate crystals may stabilize the surface against reduction of manganese to $Mn^{+2}$, it is now realized that the crystalline manganese phosphate on the surface is detrimental and preferably avoided. The addition of manganese and phosphate does correlate to the presence of $MnPO_4$ peaks in the XRD consistent with crystalline $MnPO_4$ even though at low levels the crystalline $MnPO_4$ may not be detectable.

It is a feature of the instant invention to form phosphate complexes with surface manganese, of the oxide lattice, while avoiding the formation of crystalline $MnPO_4$ which has now been determined to be formed by the addition of manganese with the phosphate, after oxide formation, or by the use of excess phosphate which is hypothesized to disrupt the manganese oxide lattice. The theoretical limit is a monolayer of phosphate on the surface of the manganese oxide.

Quantification of the optimum phosphate is difficult due to the difficulty in measuring a monolayer precisely. However, variations in the size of the crystalline lattice are taught herein to correlate with the phosphate addition wherein the lattice contracts in the a-axis dimension with the contraction ceasing with excess phosphate. Untreated sNMC has an a-axis dimension of 8.174 Å. With excess phosphate the discharge capacity decreases, peaks corresponding to crystalline manganese phosphate begin to appear in the XRD and the lattice contracts to the extent that the a-axis dimension is 8.162 Å without further contraction within reasonable working ranges. At the optimum phosphate levels the lattice is contracted to the extent that the a-axis dimension is at least 8.163 Å to no more than 8.170 Å. When the lattice is contracted to the extent that the a-axis dimension is less than 8.163 Å crystalline manganese phosphate is believed to begin formation which is detrimental to the charge capacity. If the lattice contraction is not sufficient to achieve a dimension a of less than 8.170 Å there is insufficient phosphate on the surface of the manganese oxide lattice and therefore insufficient stabilization of the surface manganese leading to an increase in $Mn^{+2}$ which is contrary to the purpose of the phosphate addition.

The lattice contraction is detectable by a shift in 2-Theta in the XRD and the extent of contraction is easily calculated using standard unit cell calculation algorithms.

The method of forming the oxide, or the precursor to the oxide, is not particularly limited herein. In one method, the oxide precursors are formed by the reaction of relatively soluble salts in the presence of counterions which form relatively insoluble salts. The relatively insoluble salts are believed to form suspended crystals which are believed to Ostwald ripen ultimately precipitating as an ordered lattice. For the purposes of the present invention soluble salts of manganese and optionally nickel and cobalt, are combined in a solution comprising counterions which precipitate the manganese, nickel and cobalt at a rate sufficient to allow crystalline growth. Soluble counterions of manganese, cobalt and nickel are those having a solubility of at least 0.1 g of salt per 100 gram of solvent at 20° C. including acetate, nitrate or hydrogen carbonate. The metals are precipitated as insoluble salts having a solubility of less than 0.05 g of salt per 100 gram of solvent at 20° C. including carbonates and oxalates.

It is preferable to include a salt of lithium. Lithium salts are generally very soluble and therefore the manganese, cobalt and nickel salts precipitate prior to lithium which primarily remains in solution until evaporation. In one embodiment lithium is added with a counterion which is suitable for precipitation of the other metals. By way of example, a preferred lithium salt is lithium carbonate and as the carbonate is depleted through precipitation of the other metals lithium can form a salt with the original counterion of the nickel, manganese or cobalt such as acetate. The result is a precipitate of lithium acetate crystals on an ordered lattice comprising at least manganese carbonate and optionally cobalt carbonate and nickel carbonate. This embodiment minimizes the added salts as the counterion salts are essentially balanced.

Upon completion of the reaction to form the oxide precursor, the resulting slurry mixture is dried to remove the solvent and to obtain the dried powder. Any type of drying method and equipment can be used and such drying is preferably at less than 350° C. Drying can be done using an evaporator such that the slurry mixture is placed in a tray and the solvent is released as the temperature is increased. Any evaporator in industrial use can be employed. A particularly preferred method of drying is a spray dryer with a fluidized nozzle or a rotary atomizer. These nozzles are preferably the smallest size diameter suitable for the size of the oxide precursor in the slurry mixture. The drying medium is preferably air due to cost considerations.

The resulting reaction product is dried by any drying method using known industrial equipment including spray dryers, tray dryers, freeze dryers and the like, chosen depending on the final product preferred. The drying temperatures would be defined and limited by the equipment utilized. The desired drying temperatures are usually from 200-325° C.

The resulting mixture is continuously agitated as it is pumped into the spray dryer head if spray dryers, freeze dryers or the like are used. For tray dryers, the liquid evaporates from the surface of the solution.

The dried powders are transferred into the calcining system batch-wise or by means of a conveyor belt. The calcining system may be a box furnace utilizing ceramic trays or saggers as containers, a rotary calciner, a fluidized bed, which may be co-current or counter-current, a rotary tube furnace and other similar equipment without limit thereto.

The heating rate and cooling rate during calcinations depend on the type of final product desired. Generally, a heating rate of about 10° C. per minute is preferred but the usual industrial heating rates are also applicable.

Calcining may also require inert gases as in the case of those materials that are sensitive to oxidation. As such, a positive flow of the inert gas may be introduced into the calcining equipment.

The final powder obtained after the calcining step is a fine, ultrafine or nanosize powder that does not require additional grinding or milling as is currently done in conventional processing. Particles are relatively soft and not sintered as in conventional processing.

The final powder is preferably characterized for surface area, particle size by electron microscopy, porosity, chemical analyses of the elements and also the performance tests required by the preferred specialized application.

The spray dried oxide precursor is preferably very fine and nanosize. Definitive microstructures or nanostructures are formed during the mixing step. Microstructures or nanostructures looking like flowers or special layering such that these structures are called nanorose, nanohydrangea, or nanocroissant or other description depending on the formulation of the powder. Such structures also translate to the final powder after the calcination step.

After drying, the oxide precursor powder is transferred to a calciner. No crushing or milling is required since the dried oxide precursor powders are very fine. In large scale production, this transfer may be continuous or batch. A modification of the spray dryer collector such that an outlet valve opens and closes as the spray powder is transferred to the calciner can be implemented. Batchwise, the spray dried powder in the collector can be transferred into trays or saggers and moved into a calciner. A rotary calciner or fluidized bed calciner can be used to demonstrate the invention. The calcination temperature is determined by the composition of the powder and the final phase purity desired. For most oxide type powders, the calcination temperatures range from as low as 400° C. to slightly higher than 1000° C. After calcination, the powders are crushed as these are soft and not sintered. The oxide precursor does not require long milling times nor classifying to obtain narrow particle size distribution.

The particle sizes of the oxide precursor are of nanosize primary and secondary particles and up to small micron size secondary particles ranging to less than 50 micron aggregates which are very easily crushed to smaller size. It should be known that the composition of the final powder influences the morphology as well. The oxide precursor has a preferred particle size of about 1-5 μm. The oxide has a preferred particle size of about 50-250 nm and more preferably about 150-200 nm.

To accomplish the reaction to form the oxide precursor solutions of the starting salts are prepared. It is preferable to prepare added solutions, preferably comprising the nickel, manganese and cobalt solutions either collectively, separately, or in some combination, and a bulk solution preferably comprising the lithium. The added solution is then added, as described elsewhere herein, to the bulk solution. The solutions can be reversed, however, it is preferable that the nickel, manganese and cobalt be added in the intended stoichiometry and it is therefore advantageous to add as a single solution comprising all three metal salts to a lithium containing bulk solution. The reactants in each solution are preferably no more than 30 wt. % of the solution.

Each solution is prepared by dissolving the solid in a selected solvent, preferably a polar solvent, such as water, but not limited thereto. The choice of the solvent is determined by the solubility of the solid reactant in the solvent and the temperature of dissolution. It is preferred to dissolve at ambient temperature and to dissolve at a fast rate so that solubilization is not energy intensive. The dissolution may be carried out at a slightly higher temperature but preferably below 100° C. Other dissolution aids may be addition of an acid or a base.

During mixing it is preferable to bubble gas into the bulk solution. For the purposes of discussion the gas is defined as inert, which has no contribution to the chemical reaction, or the gas is defined as reactive, which either adjust the pH or contributes to the chemical reaction. Preferred gases include air, $CO_2$, $NH_3$, $SF_6$, HF, HCl, $N_2$, helium, argon, methane, ethane, propane or mixtures thereof. A particularly preferred gas includes ambient air unless the reactant solutions are air-sensitive. Carbon dioxide is particularly preferred if a reducing atmosphere is required and it can also be used as a dissolution agent, as a pH adjusting agent or as a reactant if carbonates are formed. Ammonia may also be introduced as a gas for pH adjustment. Ammonia can form ammonia complexes with transition metals and may assist in dissolving such solids. Mixtures of gases may be employed such as 10% $O_2$ in argon as an example.

For the formation of the oxide precursor the pH is preferably at least about 1 to no more than about 9.6. More preferably the pH is about 7-8.

A method for forming the oxide precursor is referred to herein as the complexometric precursor formulation (CPF) method which is suitable for large scale industrial production of high performance fine, ultrafine and nanosize powders requiring defined unique chemical and physical properties that are essential to meet performance specifications for specialized applications. The CPF method provides an oxide precursor wherein the metals are precipitated as salts into an ordered lattice. The oxide precursor is then calcined to form the oxide. While not limited to theory, it is hypothesized that the formation of an ordered lattice, as opposed to an amorphous solid, facilitates oxide formation.

The CPF method provides for the controlled formation of specialized microstructures or nanostructures and a final product with particle size, surface area, porosity, phase purity, chemical purity and other essential characteristics tailored to satisfy performance specifications. Powders produced by the CPF method are obtained with a reduced number of processing steps relative to currently used technology and can utilize presently available industrial equipment.

The CPF method is applicable to any inorganic powder and organometallic powders with electrophilic or nucleophilic ligands. The CPF method can use low cost raw materials as the starting raw materials and if needed, additional purification or separation can be done in-situ. Inert or oxidative atmospheric conditions required for powder synthesis are easily achieved with the equipment for this method. Temperatures for the reactions can be ambient or slightly warm but preferably not more than 100° C.

The CPF method produces fine, ultrafine and nanosize powders of precursor oxides in a simple efficient way by integrating chemical principles of crystallization, solubility, transition complex formation, phase chemistry, acidity and basicity, aqueous chemistry, thermodynamics and surface chemistry.

The time when crystallization begins and, in particular, when the nucleation step begins, is the most crucial stage of formation of nanosize powders. A particular advantage provided by CPF is the ability to prepare the nanosize particles at the onset of this nucleation step. The solute molecules from the starting reactants are dispersed in a given solvent and are in solution. At this instance, clusters are believed to begin forming on the nanometer scale under the right conditions of temperature, supersaturation, and other conditions. These clusters constitute the nuclei wherein the atoms begin to arrange themselves in a defined and periodic manner which later defines the crystal microstructure. Crystal size and shape are macroscopic properties of the crystal resulting from the internal crystal lattice structure.

After the nucleation begins, crystal growth also starts and both nucleation and crystal growth may occur simultaneously as long as supersaturation exists. The rate of nucleation and growth is determined by the existing supersaturation in the solution and either nucleation or growth occurs over the other depending on the supersaturation state. It is critical to define the concentrations of the reactants required accordingly in order to tailor the crystal size and shape. If nucleation dominates over growth, finer crystal size will be obtained. The nucleation step is a very critical step and the conditions of the reactions at this initial step define the crystal obtained. By definition, nucleation is an initial phase change in a small area such as crystal forming from a liquid solution. It is a consequence of rapid local fluctuations on a molecular scale in a homogeneous phase that is in a state of metastable equilibrium. Total nucleation is the sum effect of two categories of nucleation—primary and secondary. In primary nucleation, crystals are formed where no crystals are present as initiators. Secondary nucleation occurs when crystals are present to start the nucleation process. It is this consideration of the significance of the initial nucleation step that forms the basis for the CPF method.

In the CPF method, the reactants are dissolved in a solution preferably at ambient temperature or, if needed, at a slightly elevated temperature but preferably not more than 100° C. Selection of inexpensive raw materials and the proper solvent are important aspects of this invention. The purity of the starting materials are also important since this will affect the purity of the final product which may need specified purity levels required for its performance specifications. As such, low cost starting materials which can be purified during the preparation process without significantly increasing the cost of processing must be taken into consideration.

CPF uses conventional equipment to intimately mix reactants and preferably includes a highly agitated mixture preferably with bubbling of gas, particularly, when reactant gas is advantageous.

It is preferred that the gas be introduced directly into the solution without limit to the method of introduction. The gas can be introduced into the solution within the reactor by having several gas diffusers, such as tubes, located on the side of the reactor, wherein the tubes have holes for the exit of the gas. Another configuration is to have a double wall reactor such that the gas passes through the interior wall of the reactor. The bottom of the reactor can also have entry ports for the gas. The gas can also be introduced through the agitator shaft, creating the bubbles upon exiting. Several other configurations are possible and the descriptions of these arrangements given herein are not limited to these. Throughout the description the point of gas being introduced into the liquid is a gas diffuser.

In one embodiment an aerator can be used as a gas diffuser. Gas diffusing aerators can be incorporated into the reactor. Ceramic diffusing aerators which are either tube or dome-shaped are particularly suitable for demonstration of the invention. The pore structures of ceramic bubble diffusers can produce relatively fine small bubbles resulting in an extremely high gas to liquid interface per cubic feet per minute (cfm) of gas supplied. A ratio of high gas to liquid interface coupled with an increase in contact time due to the slower rate of the fine bubbles can provide for a higher transfer rates. The porosity of the ceramic is a key factor in the formation of the bubble and significantly contributes to the nucleation process. While not limited thereto for most configurations a gas flow rate of at least one liter of gas per liter of solution per minute is suitable for demonstration of the invention.

A ceramic tube gas diffuser on the sides of the reactor wall is particularly suitable for demonstration of the invention. Several of these tubes may be placed in different positions, preferably equidistant from each other, to more uniformly distribute gas throughout the reactor. The gas is preferably introduced into the diffuser within the reactor through a fitting connected to the header assembly which slightly pressurizes the chamber of the tube. As the gas permeates through the ceramic diffuser body, fine bubbles may start to form by the porous structure of the material and the surface tension of the liquid on the exterior of the ceramic tube. Once the surface tension is overcome, a minute bubble is formed. This small bubble then rises through the liquid forming an interface for transfer between gas and liquid before reaching the surface of the liquid level.

A dome-shaped diffuser can be placed at the bottom of the reactor or on the sides of the reactor. With dome shape diffusers a plume of gas bubbles is typically created which is constantly rising to the surface from the bottom providing a large reactive surface.

A membrane diffuser which closes when gas flow is not enough to overcome the surface tension is suitable for demonstration of the invention. This is useful to prevent any product powder from being lost into the diffuser.

In order to have higher gas efficiencies and utilization, it is preferred to reduce the gas flow and pressure and expend less pumping energy. A diffuser can be configured such that for the same volume of gas, smaller bubbles are formed with higher surface area than if fewer larger bubbles are formed. The larger surface area means that the gas dissolves faster in the liquid. This is advantageous in solutions wherein the gas is also used to solubilize the reactant by increasing its solubility in the solution.

Nozzles, preferably one way nozzles, can be used to introduce gas into the solution reactor. The gas can be delivered using a pump and the flow rate should be controlled such that the desired bubbles and bubble rates are achieved. A jet nozzle diffuser, preferably on at least one of the sides or bottom of the reactor, is suitable for demonstration of the invention.

The rate of gas introduction is preferably sufficient to increase the volume of the solution by at least 5% excluding the action of the agitator. In most circumstances at least about one liter of gas per liter of solution per minute is sufficient to demonstrate the invention. It is preferable to recycle the gas back into the reactor.

Transfer of the added solution into the bulk solution is preferably done using a tube attached to a pump connecting the solution to be transferred to the reactor. The tube into the reactor is preferably a tube with a single orifice or several orifices of a chosen predetermined internal diameter such that the diameter size can deliver a stream of the added solution at a given rate. Atomizers with fine nozzles are suitable for delivering the added solution into the reactor. The tip of this transfer tube can comprise a showerhead thereby providing several streams of the added solution simultaneously. In large scale production, the rate of transfer is a time factor so the transfer rate should be sufficiently rapid enough to produce the right size desired.

The agitator can be equipped with several propellers of different configurations, each set comprising one or more propellers placed at an angle to each other or on the same plane. Furthermore, the mixer may have one or more sets of these propellers. The objective is to create sufficient turbulence for adequate solution turnover. Straight paddles or angled paddles are suitable. The dimensions and designs of these paddles determine the type of flow of the solution and the direction of the flow. A speed of at least about 100 rotations per minute (rpm's) is suitable for demonstration of the invention.

The rate of transfer of added solution to the bulk solution has a kinetic effect on the rate of nucleation. A preferred method is to have a fine transfer stream to control the local concentration of the reactants which influences nucleation and the rate of nucleation over the rate of crystal growth. For smaller size powder, a slower transfer rate will yield finer powders. The right conditions of the competing nucleation and growth must be determined by the final powder characteristics desired. The temperature of reaction is preferably ambient or under mild temperatures if needed.

Special nanostructures are preformed which are carried over to the final product thus enhancing the performance of the material in the desired application. For the purposes of the present invention nanostructures are defined as structures having an average size of 100 to 300 nm primary particles.

Neither surfactants nor emulsifiers are necessary. In fact, it is preferable that surfactants and emulsifiers are not used since they may inhibit drying.

Size control can be done by concentration of the solutions, flow rate of the gas or transfer rate of added solution to the bulk solution.

No repetitive and cumbersome milling and classification steps are used.

Reduced calcination time can be achieved and repetitive calcinations are typically not required.

Reaction temperature is ambient. If need for solubilization, temperature is increased but preferably not more than 100° C.

Tailored physical properties of the powder such as surface area, porosity, tap density, and particle size can be carefully controlled by selecting the reaction conditions and the starting materials.

The process is easily scalable for large scale manufacturing using presently available equipment and/or innovations of the present industrial equipment. The inventive cathode is incorporated into a battery wherein the battery comprises an anode, which is not limited herein, a separator, which is not limited herein, and a dielectric, which is not limited herein.

EXAMPLES

Phosphate treated spinel materials were produced by adding ca. 0.8 g of fired spinel material to 10 mL of phosphoric acid ($H_3PO_4$), ammonium dihydrogen phosphate (($NH_4$)$H_2PO_4$), or diammonium hydrogen phosphate (($NH_4$)$_2HPO_4$). The mixture was gently shaken to give a homogeneous appearance, then left to settle for a predetermined time. Following the treatment time, the treated material was filtered and washed with deionized water thoroughly until the filtrated water was neutral. The filtered material was then placed in a convection oven to dry at 90° C.

The treated and untreated materials were characterized physically for comparison using X-ray diffraction (XRD), thermogravimetric analysis (TGA), scanning electron microscopy (SEM), scanning tunneling electron microscopy (STEM), and energy dispersive x-ray spectroscopy (EDX).

Half cells were prepared in identical fashion for a 2032 coin type half-cell with nominal size of 20 mm diameter and 3.2 mm thickness using the cathode material being tested and lithium metal as the anode with 25 μm trilayer polypropylene/polyethylene separators and 1M $LiPF_6$ in 3:7 ethylene carbonate/diethylene carbonate (EC:DEC) blend electrolyte.

The spinel material treated with 1M $H_3PO_4$ for 24 hours showed a faint purple colour of the solution, while the 0.1M $H_3PO_4$ treated for 10 minutes and 24 hours as well as the 1M $H_3PO_4$ treated for 10 minutes did not. The change in colour may indicate dissolution of transition metal (TM) materials in the spinel material. The 0.1M $H_3PO_4$ solution used for treatment did not show any change in colour suggesting dissolution did not occur.

The XRD analysis of 0.1M and 1M $H_3PO_4$ treatment for 24 hours and 10 minutes showed no drastic changes in the XRD peak locations after 10 min and 24 hours, indicating there was no change in the crystal structures relative to the untreated examples other than as discussed elsewhere herein. However, the material which was treated in 1M $H_3PO_4$ showed impurities at lower angles which were fitted to serrabrancaite $MnPO_4 \cdot H_2O$ mineral Ref. 98-006-2220. Along with the impurities, a decrease in peak intensities, and reduced peak resolution were also observed. The reduction in peak intensity suggests changes to atoms within the crystal structure, while changes in resolution suggests changes in crystallinity. A small shift in the 2-Theta values towards higher angles was also observed The dimension of the a-axis of the lattice was calculated based on the 2-Theta shifts in the XRD with the results presented in Table 1.

TABLE 1

| Phosphate source | Concentration | Duration | lattice dimension a (Ang.) |
|---|---|---|---|
| None | N/A | N/A | 8.174 |
| $H_3PO_4$ | 0.1M | 10 min. | 8.168 |
| $H_3PO_4$ | 0.1M | 24 Hr. | 8.164 |
| $H_3PO_4$ | 1M | 10 min. | 8.162 |
| $H_3PO_4$ | 1M | 24 Hr. | 8.162 |
| $(NH_4)H_2PO_4$ | 0.1M | 10 min. | 8.175 |
| $(NH_4)H_2PO_4$ | 0.1M | 24 Hr. | 8.174 |
| $(NH_4)H_2PO_4$ | 1M | 10 min. | 8.174 |
| $(NH_4)H_2PO_4$ | 1M | 24 Hr. | 8.172 |
| $(NH_4)_2HPO_4$ | 0.1M | 10 min. | 8.174 |
| $(NH_4)_2HPO_4$ | 0.1M | 24 Hr. | 8.174 |
| $(NH_4)_2HPO_4$ | 1M | 10 min. | 8.173 |
| $(NH_4)_2HPO_4$ | 1M | 24 Hr. | 8.173 |

Thermal analysis of the material treated with phosphoric acid was compared to both untreated LMNO material, as well as manganese III phosphate hydrate (Mn(III)$PO_4 \cdot xH_2O$). Through this comparison it was clear that the material treated with $H_3PO_4$ showed multiple mass losses, with the material treated in 1M $H_3PO_4$ losing the most mass of the two treated samples suggesting the presence of Mn(III)$PO_4$ in the sample.

Both the untreated and 0.1M $H_3PO_4$ treated samples appear to have similar gross morphologies as evidenced by SEM, where the expected octahedral shape of the spinel material is observed. However, the 1M treated sample it is observed that larger agglomerates formed.

STEM images of the 0.1M and 1M $H_3PO_4$ 24 hour treated materials also show similarities between the 0.1M treated material, and the untreated material. In these two materials regions of high Ni were observed in the EDX map and the overall material had an octahedral shape. The EDX spectra for these samples were also similar, and phosphorus was not detected in the 0.1 M treated sample. The inability to detect phosphorus is an indication that the concentration present is insufficient to be detected, since implications of the presence of $MnPO_4$ were observed in the TGA data. Also, the crystallinity of the material suggests no degradation due to the presence of the acid.

Images of the 1M treated samples did however, show degradation of the crystal structure as part of the agglomerate appears amorphous while the other part remains crystalline. The EDX spectrum also shows the presence of phosphorus which is a strong indication of $MnPO_4$ since impurity peaks of $MnPO_4$ were observed in the XRD pattern. The Mapping image also shows higher concentrations of phosphorus in the amorphous regions of the agglomerate further suggesting that degredation of the material occurred. Due to the presence of phosphors being observed when treated with 1M $H_3PO_4$, this is also a strong indication that $MnPO_4$ may be on the surface of the spinel material, however when 0.1M $H_3PO_4$ was used the $MnPO_4$ present is not crystalline and in low abundance since it was not detected by XRD or EDX.

Half cells prepared using treated and untreated material were analysed initially at C/10 to determine the maximum discharge capacity of the material. FIG. 1 depicts the discharge profile of the treated and untreated spinel material. However, the capacity of the material treated in 0.1M $H_3PO_4$ showed a similar capacity to the untreated material, while the material treated in 1M $H_3PO_4$ showed a lower overall capacity. This decrease in capacity could be caused by degradation of the spinel material through dissolution due to the concentration of the acid. It may also be attributed to the $MnPO_4$ impurities which were observed in the XRD pattern.

Figure 2:
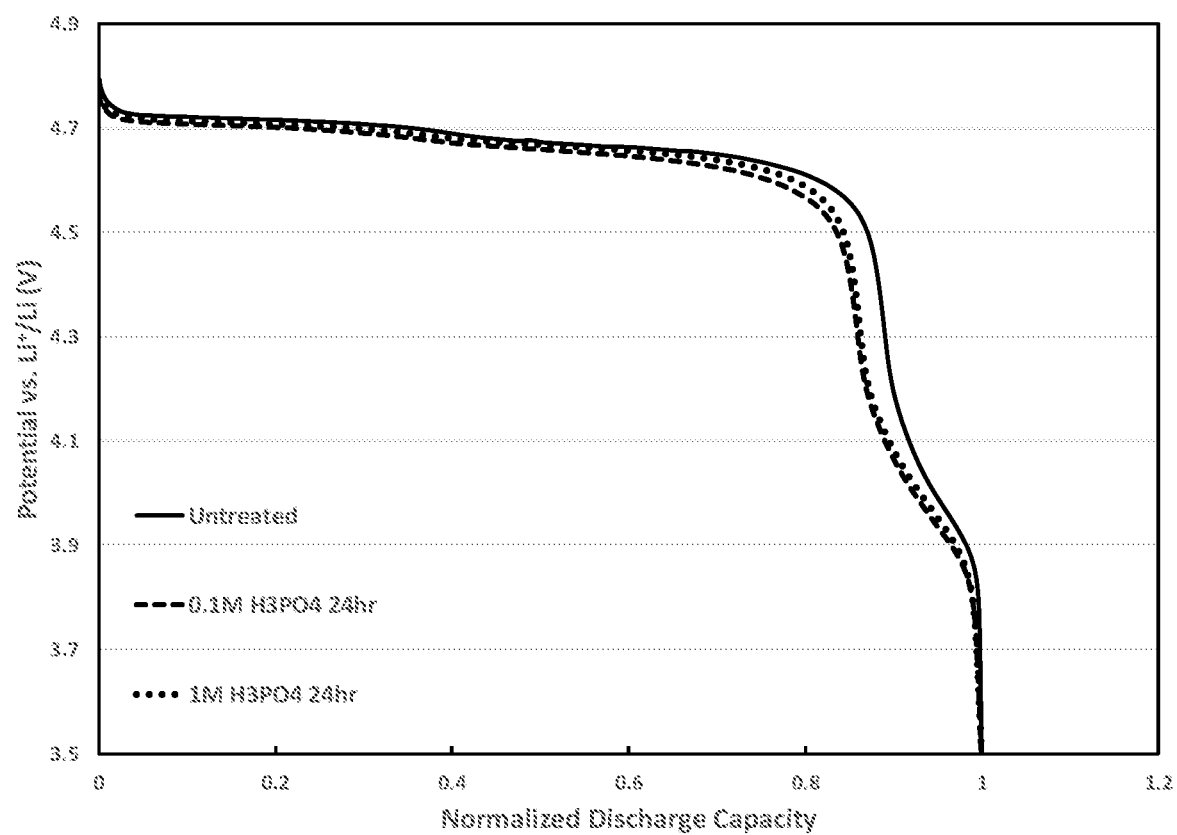

FIG. 2 shows a normalized discharge profile, which allows comparison of the 4 V plateau region associated with the $Mn^{3+}/Mn^{4+}$ redox couple. When normalized, the discharge of the acid treated material showed a shift to a lower capacity between 4.5 V and 3.9 V. A shift to lower capacities in this region may indicate an increase in the $Mn^{3+}/Mn^{4+}$ couple. This increase could be associated with the possible increased Mn reduction through Li leaching.

Figure 3:
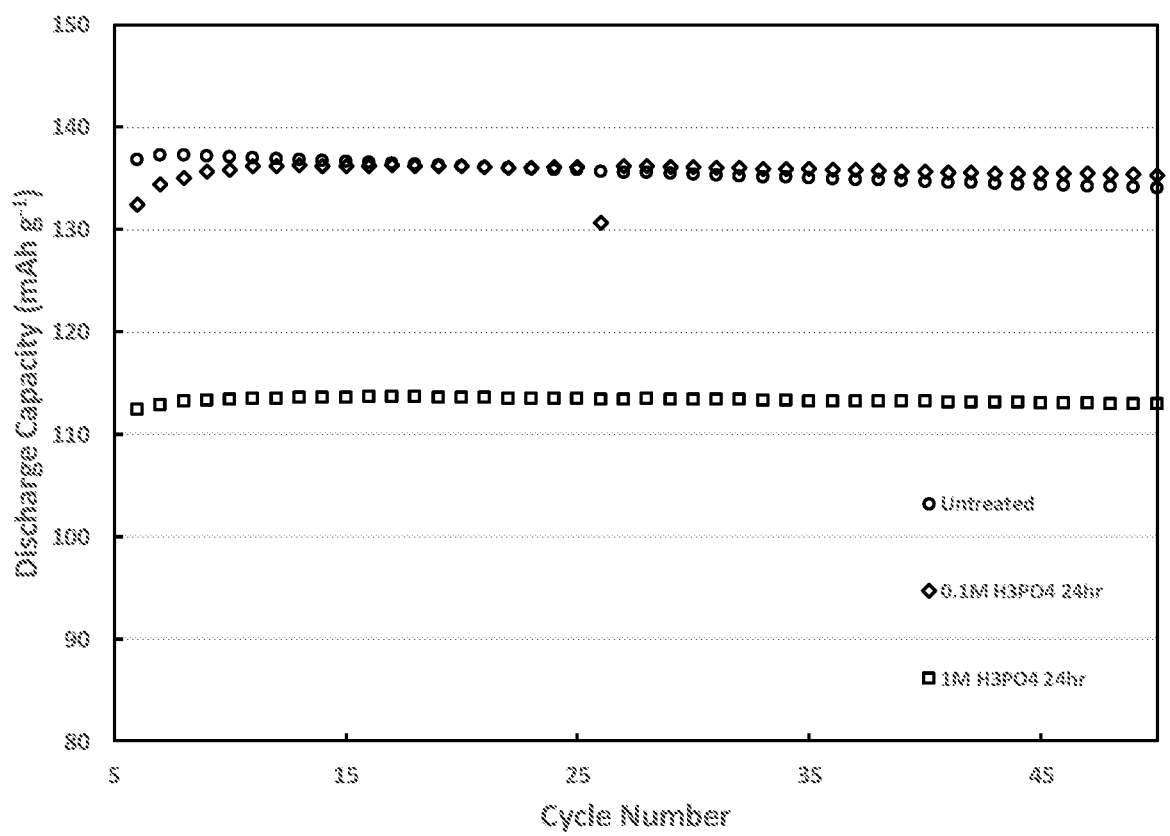
Figure 4:
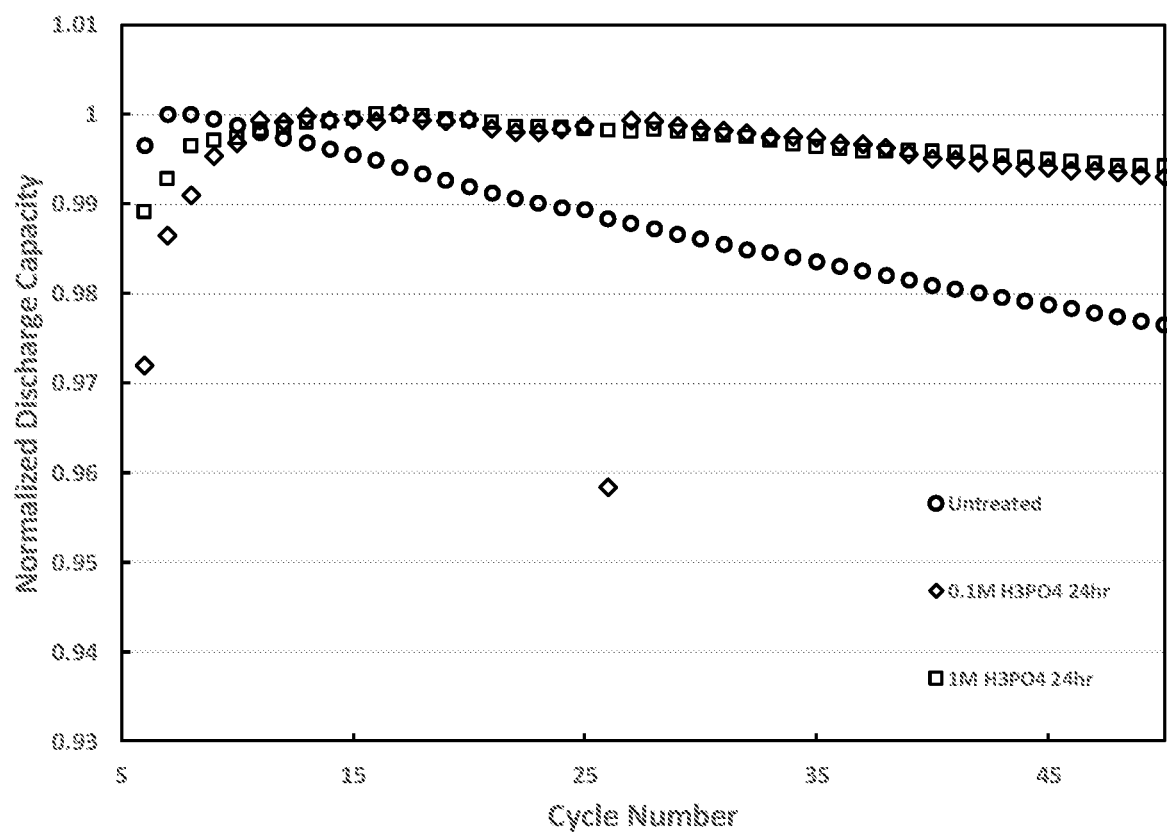

Durability testing of the acid treated materials were completed at a charge rate of 1 C at 25° C. and compared to an untreated material. Both acid treated samples appeared to be more horizontal over 50 hours of testing for the 24 hour treated materials seen in FIG. 3. However, when taking the overall capacity into consideration, the material treated in 1M $H_3PO_4$ was not comparable to either the 0.1 M $H_3PO_4$ treated, or the untreated material. Normalization of the stability testing allows the actual fading of the cell over time to be compared. FIG. 4 showed both acid treated samples having more stability over 50 hours than the untreated material. However, comparison of the capacity shows that the 0.1M treated material has a capacitance more comparable to the untreated material while being more durable.

Figure 5:
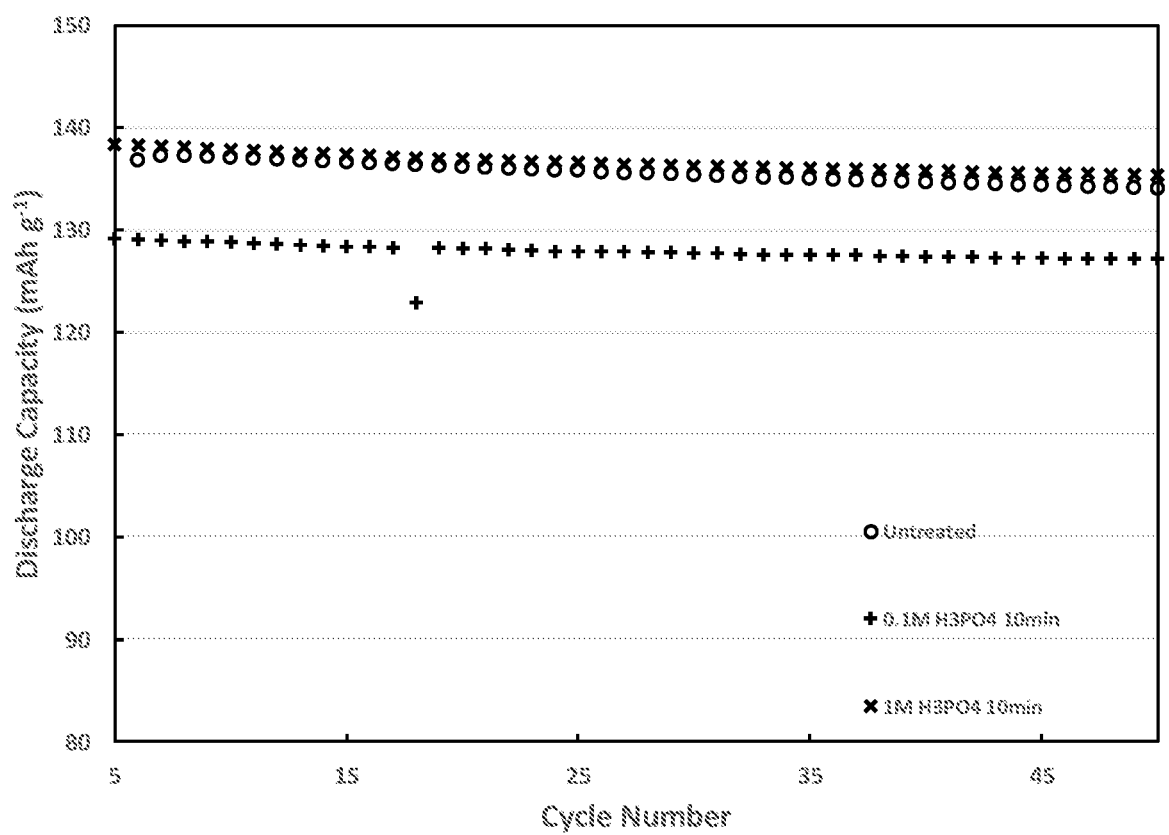
Figure 6:
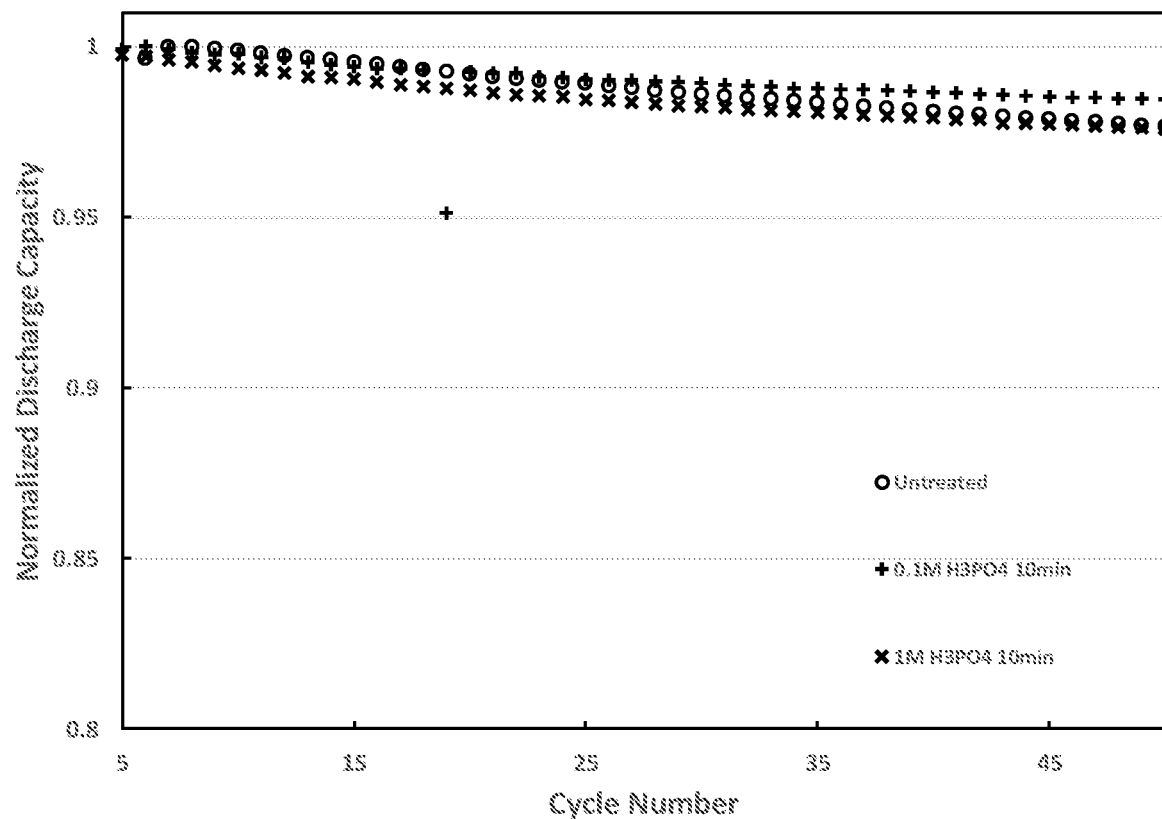

FIG. 5 depicts the stability testing of the acid treated samples for 10 minutes at 25° C., and shows a similar trend to the untreated sample. The normalized stability in FIG. 6 also does not show any obvious difference between the stability of the treated and untreated materials.

In thermal analysis the material treated with 0.1M and 1M $(NH_4)H_2PO_4$ for 10 minutes and 24 hours. The 10 minute and 24 hour 0.1M treated samples did not show degradation occurring suggesting the material was not treated with phosphate groups. The 1M $(NH_4)H_2PO_4$ showed degradation occur for the 24 hour sample, while the 10 minute treated sample did not. The derivative mass loss of the 1M 24 hour treated sample did not show a similar profile to the $MnPO_4$ $xH_2O$ sample, suggesting $MnPO_4$ was not formed on the material.

The discharge profile at a rate of C/10 for the $(NH_4)H_2PO_4$ 24 hour treated samples showed no changes in the overall profile, or the capacity with concentration when compared to the untreated sample suggesting no change to the material. Normalization of the discharge profile also showed no differences between the 4 V plateau, further supporting no change to the overall crystal structure as well as no phosphate incorporation. The durability test of the material does not show a clear difference in capacity fade similar to that seen in the acid treated materials.

The discharge profile for the 10 minute treated samples showed different capacities between the three samples, but comparing the observed trend to the XRD patterns, lattice parameters, and TGA plots, this difference does not appear to be due to changes to the material due to the treatment. Normalization of these patterns however, does show a small difference in the 4V plateau for the 1M treated sample. With no observable changes being observed during the characterization of the material this deviation can not be explained, however this deviation does appear to effect the durability of the material which is seen to fade in capacity faster than the untreated material. Comparison of the 0.1M treated material does show similar durability to the untreated material however.

There was no obvious difference observed between the 24 hour $(NH_4)_2HPO_4$ treated samples at either 0.1M or 1M. The lack of variation between the samples further suggests no change to the crystal structure due to addition of phosphate groups. Comparison of the 10 minute treated samples however, did show a decrease in the 4V plateau for the 1M treated sample and did not appear to have a similar profile to the other two cells when normalized. Comparing the change observed in capacity profile of the 1M $(NH_4)_2HPO_4$ sample to the profile of the acid treated material, it is evident that the change is not an increase in the $Mn^{3+}/Mn^{4+}$ redox couple. This may indicate insufficient washing of the sample after treatment with the phosphate salt, resulting in poor capacity of the cell.

Durability of the material however, showed results which were unexpected from the initial observations at C/10. The samples treated for 24 hours both showed capacities that appear similar, but upon normalization of the data a clear difference can be observed where both treated samples were less durable over time, with the 1M sample showing the most instability by the end of the test. The 10 minute treated samples did show comparable durability to the untreated sample contrary to what was expected based on the initial discharge capacities.

Figure 7:
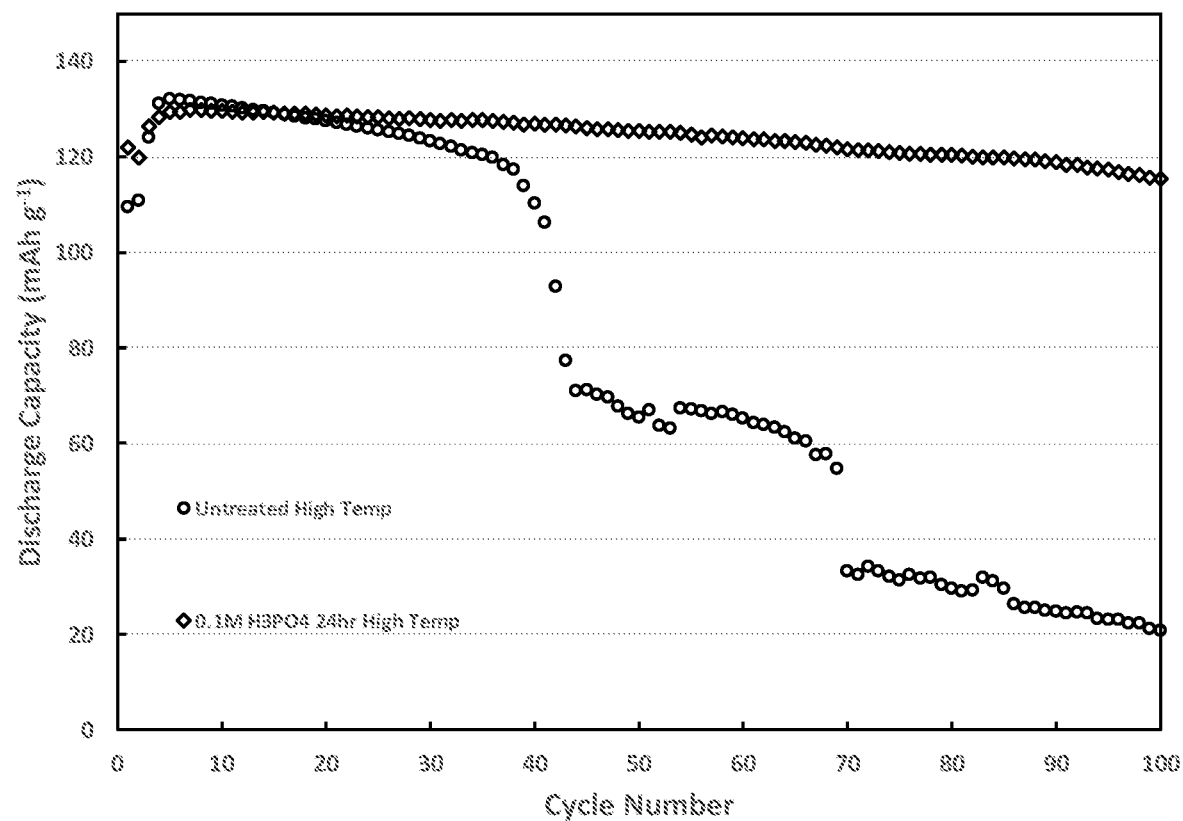

Considering the results obtained by the various phosphate sources used to treat the HV spinel material, as well as the time used for treatment, it was decided that the 0.1M H3PO4 treatment for 24 hours would be the most suitable for further high temperature studies. Durability testing was completed at 55° C. to amplify any side reactions which may cause degradation of the cathode material, and ultimately lead to cell failure. FIG. 7 depicts the untreated cell failing catastrophically by 40 hours of testing, while the cathode treated with 0.1M $H_3PO_4$ for 24 hours continued to cycle up to 100 hours.

The results demonstrate the advantage of phosphate bound to the surface manganese and detriment of a manganese phosphate crystalline phase from either the addition of manganese with phosphate or excessive phosphate treatment. The optimum level of phosphate incorporation can be determined by monitoring the lattice contraction wherein when the a-axis dimension of the lattice is at least 8.163 Å to no more than 8.170 Å sufficient stability against the formation of $Mn^{+2}$ is provided with adequate charge capacity.

The invention has been described with reference to the preferred embodiments without limit thereto. One of skill in the art would realize additional embodiments and improvements which are not specifically set forth herein but which are within the scope of the invention as more specifically set forth in the claims appended hereto.

The invention claimed is:

1. A method of forming a lithium ion cathode material comprising:
   calcining an oxide precursor to form calcined oxide powder wherein said calcined oxide powder comprises manganese; and
   reacting a surface of said calcined oxide powder with phosphoric acid thereby forming a phosphate ligated to a surface of said calcined oxide powder.

2. The method of forming a lithium ion cathode material of claim 1 wherein said calcined oxide powder does not comprise crystalline $MnPO_4$.

3. The method of forming a lithium ion cathode material of claim 1 wherein said phosphate ligated to said surface comprises a manganese phosphate bond.

4. The method of forming a lithium ion cathode material of claim 1 wherein said forming of said oxide precursor comprises:
   forming a bulk solution comprising a first salt comprising a one material selected from a first lithium salt or a first manganese salt;
   forming an adding solution comprising a second salt comprising one material selected from said first lithium salt or said first manganese salt wherein said second salt is different from said first salt;
   adding said adding solution to said bulk solution thereby precipitation an ordered lattice comprising a second manganese salt; and
   precipitating a second lithium salt on said ordered lattice thereby forming said oxide precursor.

5. The method of forming a lithium ion cathode material of claim 4 further comprising:
   combining said first manganese salt with at least one second metal salt selected from a nickel salt or a cobalt salt.

6. The method of forming a lithium ion cathode material of claim 4 wherein said ordered lattice further comprises at least one metal salt selected from a nickel salt or a cobalt salt.

7. The method of forming a lithium ion cathode material of claim 4 wherein said calcined oxide powder further comprises at least one metal selected from the group consisting of cobalt and nickel.

8. The method of forming a lithium ion cathode material of claim 1 wherein said cathode material is selected from Formula I:

$$Li_{1-a-b-c-d}Ni_aMn_bCo_cD_dO_2 \quad \text{Formula I}$$

wherein D is a first dopant;
a+b+c+d≤1; at least b is not zero; and
d≤0.1;
or Formula II:

$$LiNi_xMn_yCo_zE_eO_4 \quad \text{Formula II}$$

wherein E is a second dopant;
x+y+z≤2; at least y is not zero; and more preferably none of x, y or z are zero; and
e≤0.1.

9. The method of forming a lithium ion cathode material of claim 8 wherein said Formula II is in a spinel crystalline form.

10. The method of forming a lithium ion cathode material of claim 9 wherein said spinel crystalline form has a unit cell with an a-axis dimension of at least 8.163 Å to no more than 8.170 Å.

11. The method of forming a lithium ion cathode material of claim 8 wherein none of a, b or c are zero.

12. The method of forming a lithium ion cathode material of claim 8 wherein x and y are not zero.

13. The method of forming a lithium ion cathode material of claim 8 wherein said cathode material is NMC 1:1:1.

14. The method of forming a lithium ion cathode material of claim 8 wherein said cathode material is $LiNi_{0.5}Mn_{1.5}O_4$.

15. The method of forming a lithium ion cathode material of claim 8 wherein at least one of said first dopant or said second dopant is selected from the group consisting of Al, Gd, Ti, Zr, Mg, Ca, Sr, Ba, Cr and B.

16. The method of forming a lithium ion cathode material of claim 15 wherein at least one of said first dopant or said second dopant is selected from the group consisting of Al and Gd.

17. A method of forming a lithium ion cathode material comprising:
   calcining an oxide precursor to form calcined oxide powder wherein said calcined oxide powder comprises manganese; and
   reacting a surface of said calcined oxide powder with a phosphate thereby forming a phosphate ligated to a surface of said calcined oxide powder wherein less than 10% of surface manganese is in a +2 oxidation state.

* * * * *